United States Patent [19]

Muller

[11] Patent Number: 4,939,703

[45] Date of Patent: Jul. 3, 1990

[54] TRANSDUCER BAFFLE AND SENSOR USING SAME

[75] Inventor: Lon J. Muller, Groveland, Mass.

[73] Assignee: Denning Mobile Robotics, Inc., Wilmington, Mass.

[21] Appl. No.: 382,076

[22] Filed: Jul. 17, 1989

Related U.S. Application Data

[63] Continuation of Ser. No. 202,057, Jun. 3, 1988, abandoned.

[51] Int. Cl.[5] .............................................. G01S 15/00

[52] U.S. Cl. .................................... 367/140; 181/123; 181/139; 181/155; 181/191; 381/158

[58] Field of Search ............... 181/123, 124, 139, 400, 181/155, 158, 175, 191, 154; 367/87, 103, 104, 119, 120, 140, 909, 178, 88; 381/158, 160, 156, 163

[56] References Cited

U.S. PATENT DOCUMENTS 3,028,752 7/1962 Bacon ............................ 367/151 X
3,532,182 10/1970 Bouyoucos ..................... 367/151 X
3,939,467 2/1976 Cook et al. .......................... 367/157
3,964,571 6/1976 Snell ............................... 181/155 X
3,982,142 9/1976 Goble .............................. 310/335 X
4,170,142 10/1979 Posakony et al. .................... 367/96
4,201,971 5/1980 Saglio ............................. 367/151 X
4,701,893 10/1987 Muller et al. ......................... 367/87

FOREIGN PATENT DOCUMENTS 884616 7/1949 Fed. Rep. of Germany ...... 367/151

*Primary Examiner*—Brian S. Steinberger
*Attorney, Agent, or Firm*—Joseph S. Iandiorio

[57] ABSTRACT

A baffle for enlarging the field of view of and enhancing collection of radiation for a sensor apparatus having a transducer for receiving radiation within its field of view. The baffle includes a base securable proximate the transducer, and at least one blade element extending from the base outwardly from the transducer. The base element includes a proximal edge transecting the transducer to establish at least two apertures for the transducer for enlarging its field of view. The blade element is reflective for the radiation to enhance collection of the radiation from a periphery of the enlarged field of view.

10 Claims, 6 Drawing Sheets

TRANSDUCER BAFFLE AND SENSOR USING SAME

This is a continuation of application Ser. No. 071,202,057, filed June 3, 1988, now abandoned.

FIELD OF INVENTION

This invention relates to a baffle for enlarging the field of view of a sensor and more particularly to such a baffle having one or more reflective blade elements.

BACKGROUND OF INVENTION

There are a number of applications in which transducers are used to detect incoming radiation. One application is for ranging and obstacle avoidance for a mobile robot, such as described in U.S. Pat. No. 4,701,893 by Muller et al. For the mobile robot described by Muller et al., twenty-four ultrasonic transducers are arranged in a ring about the robot. The large number of transducers is required to provide 360 degrees of coverage, because each transducer transmits pulses of radiation having a narrow beam, that is, a narrow wavefront pattern. In addition to being narrow, the beam has a number of nodes or null zones as little as fifteen degrees from the main beam axis. Detection is poor in these null zones.

Manufacturing a device having a large number of sensors entails more than simply the cost of many transducers. Each transducer requires accompanying circuitry to drive it and to process echo signals developed by the transducer when echo pulses are returned. The sensors consume power and add additional weight which are significant handicaps for devices operated by batteries.

Even where cost, weight and power consumption are not a factor, a large number of sensors would interfere with each other if operated simultaneously. In the mobile robot having twenty-four sensors, for example, the sensors are operated in a number of different banks of sensors; in other words, only several of the sensors are operating at a time. Therefore, only small areas of the entire environment of the robot can be monitored at a time.

SUMMARY OF INVENTION

It is therefore an object of this invention to provide an improved sensor apparatus having a wider field of view for incoming radiation.

It is a further object of this invention to provide such a sensor apparatus having a more uniform distribution of beam energy to minimize nodes and null zones.

Yet another object of this invention is to provide such a sensor apparatus which permits fewer sensors to be used in a sensor array to monitor an environment.

It is a further object of this invention to provide such a sensor apparatus which reduces the cost, weight and power consumption of a sensor array.

It is a further object of this invention to provide such a sensor apparatus which can utilize a smaller transducer.

A still further object of this invention is to provide sensors for a sensor array which can be cycled faster and have increased responsiveness.

A still further object of this invention is to provide a baffle for a transducer to redistribute its transmission and reception characteristics to enhance its field of view.

This invention results from the realization that truly effective monitoring of a large area can be achieved by widening the field of view of a transducer using a baffle having one or more blade elements which transect the transducer to establish two or more apertures for enlarging the field of view, the blade elements being reflective to enhance collection of radiation from the periphery of the enlarged field of view. It is a further realization of this invention that the beamshape of radiation transmitted by the transducer can be controlled by such a baffle to more evenly distribute the energy over the enlarged field of view.

This invention features a sensor apparatus with enlarged field of view and enhanced collection of radiation. There is a transducer for receiving radiation within its field of view, and a baffle having a base securable proximate the transducer and having at least one blade element extending from the base outwardly from the transducer. The blade element includes a proximal edge transecting the transducer to establish at least two apertures for the transducer for enlarging its field of radiation to enhance collection of the radiation from a periphery of the enlarged field of view.

In one embodiment, the blade element is normal to the transducer. Alternatively, the blade element is inclined toward one edge of the transducer. The radiation includes a predetermined wavelength and the length of the blade element is a function of the predetermined wavelength.

In another embodiment, the base includes first and second base portions and the baffle includes first and second blade elements extending from the first and second base portion, respectively. The blade elements establish a central, proximal aperture and a central, distal aperture between them, and establish first and second side apertures on either side of the central, proximal aperture. The blade elements may be inclined to establish the central, distal aperture wider than the central, proximal aperture and be unequal in length, such as one blade element being shorter than the other by a fraction of the predetermined wavelength. The base further includes means for bridging the first and second base portion to establish the baffle as an integral unit.

In yet another embodiment, the proximal edge is disposed nearly against the transducer and the blade element is planar and movable relative to the transducer. The sensor apparatus further includes means for altering the inclination of the blade element relative to the transducer.

This invention also features a sensor apparatus having a transducer for transmitting a pulse of radiation having a first beamshape and for receiving an echo pulse, drived from the radiation pulse, within its field of view, and a baffle having a base securable proximate the transducer and having at least one blade element extending from the base outwardly from the transducer. The blade element includes a proximal edge transecting the transducer to establish at least two apertures for the transducer for enlarging the beamshape and for enlarging the field of view. The blade element is reflective for the radiation to distribute a portion of the radiation pulse to a periphery of the enlarged field of view and enhance collection of the echo pulse from the enlarged field of view.

In one embodiment, the configuration of the apertures and the blade element controls the beamshape of the radiation pulse to distribute the beamshape toward the periphery while rendering the beamshape more uniform across the enlarged field of view. The baffle includes first and second blade elements for establishing a central, proximal aperture, a central, distal aperture and first and second side apertures. The central apertures form a portion of the radiation pulse as a central lobe and the first and second side apertures form first and second side lobes, respectively, for the radiation pulse. The sensor apparatus may be used in a mobile robot to detect obstacles.

DISCLOSURE OF PREFERRED EMBODIMENT

Other objects, features and advantages will occur from the following description of a preferred embodiment and the accompanying drawings, in which.

This invention may be accomplished by a baffle for enlarging the field of view of, and enhancing the collection of radiation for, a sensor apparatus having a transducer for receiving radiation within its field of view. The baffle has a base securable proximate the transducer and has at least one blade element extending from the base outwardly from the transducer. The blade element includes a proximal edge transecting the transducer to establish at least two apertures for the transducer for enlarging its field of view. Further, the blade element is reflective for the radiation to enhance collection of the radiation from a periphery of the enlarged field of view.

In one construction, the transducer transmits as well as receives radiation. When the blade element is normal to the transducer, two wide-angle side lobes are established during transmission and reception. The width of each lobe is controlled by its respective aperture as expanded further by reflection from the blade. When the blade element is inclined toward one edge of the transducer, the lobe produced on the inclined side is controlled both by the size of the aperture and by reflection, while the lobe on the opposite side is controlled primarily by the size of the aperture.

In another construction, two blades transect a transducer to establish four apertures: a central, proximal aperture between the proximal edges of the blades; a central, distal aperture between the distal edges of the blades; and a side aperture to either side of the central, proximal aperture. The blades establish a central lobe whose pattern is controlled primarily by the size of the proximal and distal apertures, and two side lobes which are controlled by the respective side apertures and by reflection from the blades. The main axis of the side lobes is controlled by the angle of the blades.

Figure 1:
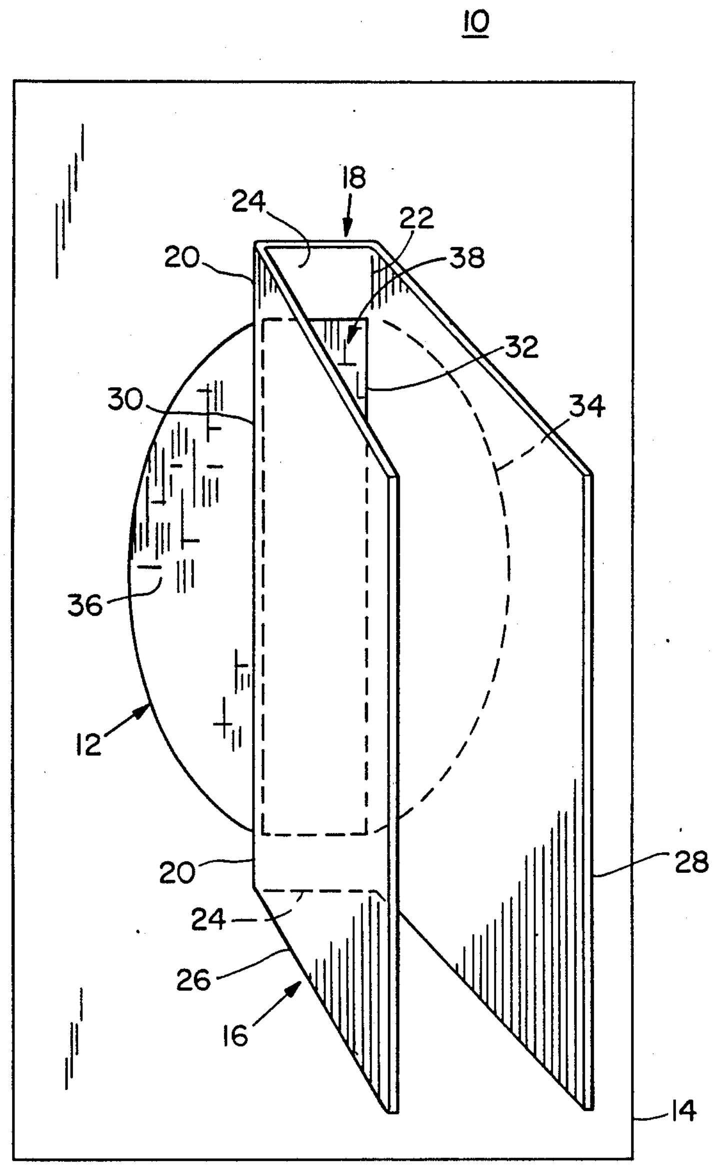
FIG. 1 is an axonometric view of a sensor apparatus according to this invention having a baffle with two blades.

Sensor apparatus 10 according to this invention, FIG. 1, includes transducer 12 mounted in panel 14. Baffle 16 according to this invention is mounted to panel 14 by base 18. Base 18 includes base portions 20 and 22 which are joined by bridge 24. Blades 26, 28 extend from base portions 20, 22, respectively. In this construction base portions 20, 22 are joined at two locations by bridge 24 on opposite edges of transducer 12.

Proximal edges 30, 32 of blades 26, 28 are disposed nearly against transducer 12 to establish side apertures 34, 36 and central, proximal aperture 38. Edges 30, 32 are disposed as close as possible to transducer 12 to minimize ringing and to increase the separation effect, that is, to define three discrete apertures proximate the transducer.

Figure 2:
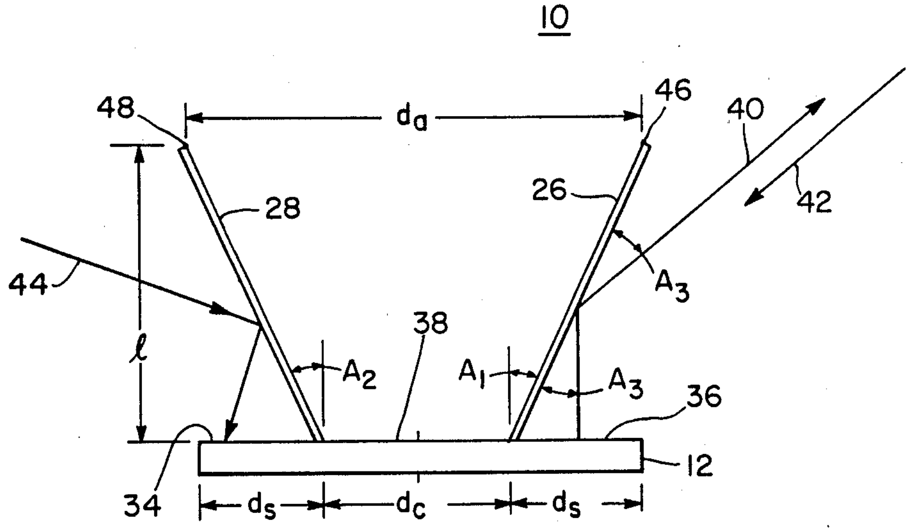
FIG. 2 is a schematic diagram of the sensor of FIG. 1 showing reflection by the blades.

Sensor apparatus 10 according to this invention is shown in schematic top plan view in FIG. 2. The width of the side apertures is represented by $d_s$, the width of the central, proximal aperture is represented by $d_c$, and the width of the central, distal aperture is represented by $d_a$. Blades 26, 28 are inclined at angles $A_1$ and $A_2$. These angles are typically, but not necessarily, equal.

In this construction transducer 12 is an electrostatic transducer of the Sell type, available from Polaroid. During transmission, ultrasonic pulses are generated which travel simultaneously through apertures 34, 36 and 38. The ultrasonic pulse emerging from aperture 36 is represented for ease of illustration by ray 40, although the pulse is actually a wavefront. Pulse 40 strikes blade 26 at angle $A_3$ and is reflected at the same angle. Any obstacle within the field of view of sensor apparatus 10, also referred to as the target area, returns an echo pulse. Echo pulse 42 is shown returning from an obstacle at the periphery of the target area toward aperture 36.

An echo pulse returning from another periphery is represented by arrow 44. While this echo pulse would normally miss transducer 12 entirely, blade 28 reflects it to strike transducer 12, thus enhancing collection of radiation.

The actual values of the lengths and angles of the sensor apparatus depend upon the particular application and on the type of radiation involved. Typically, as angles $A_1$ and $A_2$ are increased, a dead zone appears between the main lobe and the two side lobes. As the length of the blades increases, ringing increases. The effect of varying several parameters including the distance 1 of proximal aperture $d_a$ from transducer 12 is shown in Table I:

TABLE I

| | BEAMSHAPE COMPARISON | | | | | | | |
|---|---|---|---|---|---|---|---|---|
| | Example 1 | | Example 2 | | Example 3 | | Example 4 | |
| Degrees | R | L | R | L | R | L | R | L |
| 0 | 13 | | 11 | | 9.2 | | 13 | |
| 5 | 13 | 11 | 10.4 | 10 | 11 | 11 | 10.5 | 8.0 |
| 10 | 8 | 3.1 | 10 | 8.4 | 9.6 | 8 | 7 | 6.0 |
| 15 | 1.8 | 2.4 | 6 | 3.6 | 5.3 | 2.8 | 6.4 | 2.0 |
| 20 | 2.4 | 1.4 | 1.5 | 0.6 | 0.9 | 0.6 | 2.1 | 1.8 |
| 25 | 1.3 | 1.0 | 2.2 | 1.8 | 2.2 | 1.8 | 2.4 | 2.0 |
| 30 | 1.4 | 1.3 | 3.3 | 3.2 | 3.1 | 2.7 | 2.9 | 3.0 |
| 35 | 1.7 | 1.0 | 4.2 | 4.8 | 3.8 | 3.8 | 3.1 | 4.8 |
| 40 | 0.8 | 0.3 | 4.3 | 6.1 | 4.0 | 5.1 | 3.7 | 5.8 |
| 45 | 0.5 | 0.26 | 3.6 | 5.2 | 4.0 | 5.5 | 4.8 | 5.8 |
| 50 | 0.7 | 0.25 | 2.8 | 4.6 | 3.4 | 4.5 | 5.1 | 4.6 |
| 55 | 0.7 | 0.24 | 3.0 | 4.3 | 2.6 | 3.4 | 3.9 | 2.8 |
| 60 | 0.7 | 0.31 | 2.8 | 3.2 | 2.8 | 2.9 | 1.9 | 1.1 |
| 65 | 0.6 | 0.30 | 2.3 | 2.5 | 2.5 | 2.1 | 0.7 | 0.5 |
| 70 | 0.4 | 0.20 | 1.8 | 1.5 | 1.8 | 1.4 | 1.1 | 1.5 |
| 75 | 0.5 | 0.26 | 1.6 | 1.2 | 1.7 | 1.0 | 1.1 | 1.2 |
| 80 | 0.5 | 0.26 | 1.5 | 0.9 | 1.5 | 0.8 | 0.9 | 0.5 |
| 85 | 0.4 | 0.20 | 1.2 | 0.7 | 1.2 | 0.5 | 0.6 | 0.8 |
| 90 | 0.3 | 0.13 | 0.8 | 0.4 | 0.8 | 0.3 | 0.6 | 0.6 |

In the above Examples a Polaroid transducer was driven to emit a 40 microsecond pulse at a frequency of 50 KHz. The listed numbers represent relative sound intensity. The blades were constructed of luminum having a thickness of 0.04 inch. The data of Example 1 was obtained from an unmodified transducer. In Example 2, distal aperture $d_a$ was 2.25 inch proximal aperture $d_c$ was ⅝ inch, distance 1 was 2 inches and $A_{1,2}$ were 20°. In Example 3, $d_a$ was 1.75 inch, proximal aperture $d_c$ was ⅝ inch, distance 1 was 1.5 inch, and $A_{1,2}$ were 20°. In Example 4, aperture $d_a$ was 1.0 inch, proximal aperture $d_c$ was 0.5 inch, distance 1 was 1 inch, and $A_{1,2}$ were 15°.

Distance 1 of proximal aperture $d_a$ represents the farthest extension of baffles 26, 28. Typically, the actual length of the baffles is unequal. Sound reflected directly back from distal edges 48, 46 of the baffle is undesirable because the reflected sound masks echoes from real objects at ranges less than 4 inches. In this construction, blade 26 is shorter than blade 28 by one quarter of a wavelength to minimize this echo effect. Portions of a transmitted pulse reflect from distal edges 46, 48, respectively, and return directly to transducer 12. The portion returning from distal edge 46 of blade 26, which is shorter than blade 28, is a wavefront one-half of a wavelength ahead of the wavefront returning from distal edge 48, and the two wavefronts therefore cancel each other. For an ultrasonic pulse at 50kHz, the wavelength is approximately one quarter of an inch, and therefore the length of blade 26 is one sixteenth of an inch shorter than blade 28. For a single blade embodiment, it is desirable for the blade to be an integral multiple plus one-quarter of a wavelength in length.

The main axis of the side lobes is controlled by the angle of the blades. If angle $A_3$ equals $A_1$, then ray 40 represents the main axis; in other words, the main axis of the side lobe is twice angle $A_1$ from normal.

Figure 3:
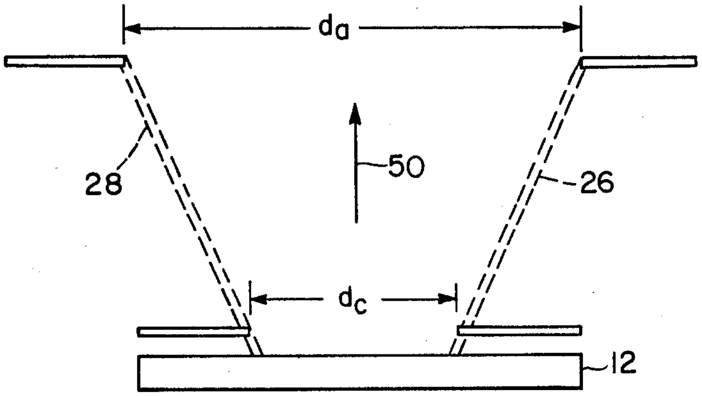
FIG. 3 is a schematic diagram illustrating the central apertures of the sensor of FIG. 1.

The effective central apertures established by blades 26, 28 is shown in FIG. 3. Proximal aperture $d_c$ diffracts radiation to widen beam 50 to follow blades 26, 28 so that there is sufficient energy at the edges of distal aperture $d_a$ to control center lobe width by operating to narrow the lobe. In other words, distal aperture $d_a$ controls the width of the central lobe when proximal aperture $d_c$ is smaller than $d_a$ and blades 26, 28 operate as a waveguide. Both reflection and diffraction phenomena are involved in this construction, with reflection dominant for the side lobes and diffraction dominant for the central lobe.

Figure 4:
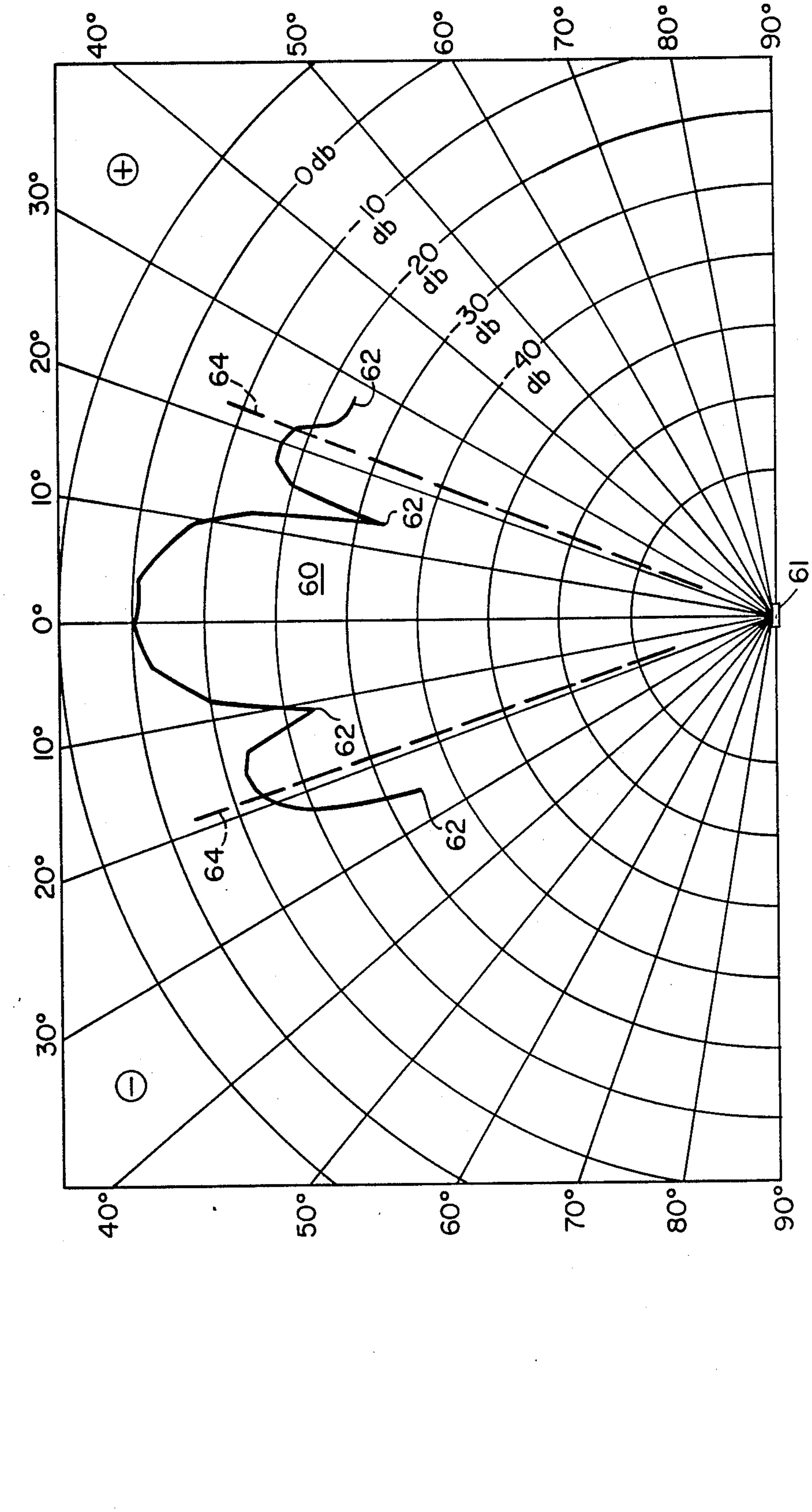
FIGS. 4–6 are polar coordinate graphs of intensity versus azimuthal angle for the beamshapes generated by an unmodified transducer; a transducer having all but a central aperture masked; and a transducer having a baffle according to this invention, respectively.
Figure 5:
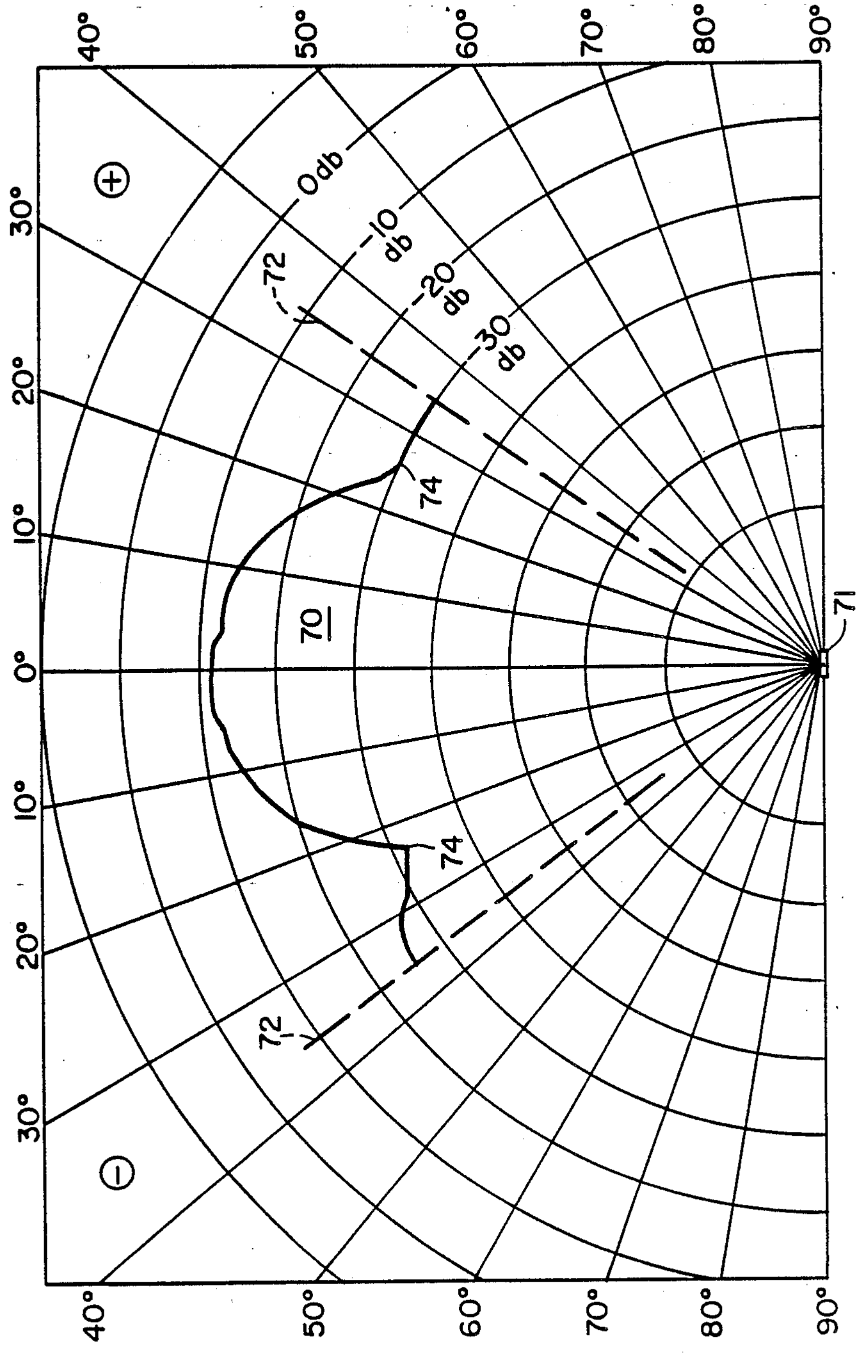
Figure 6:
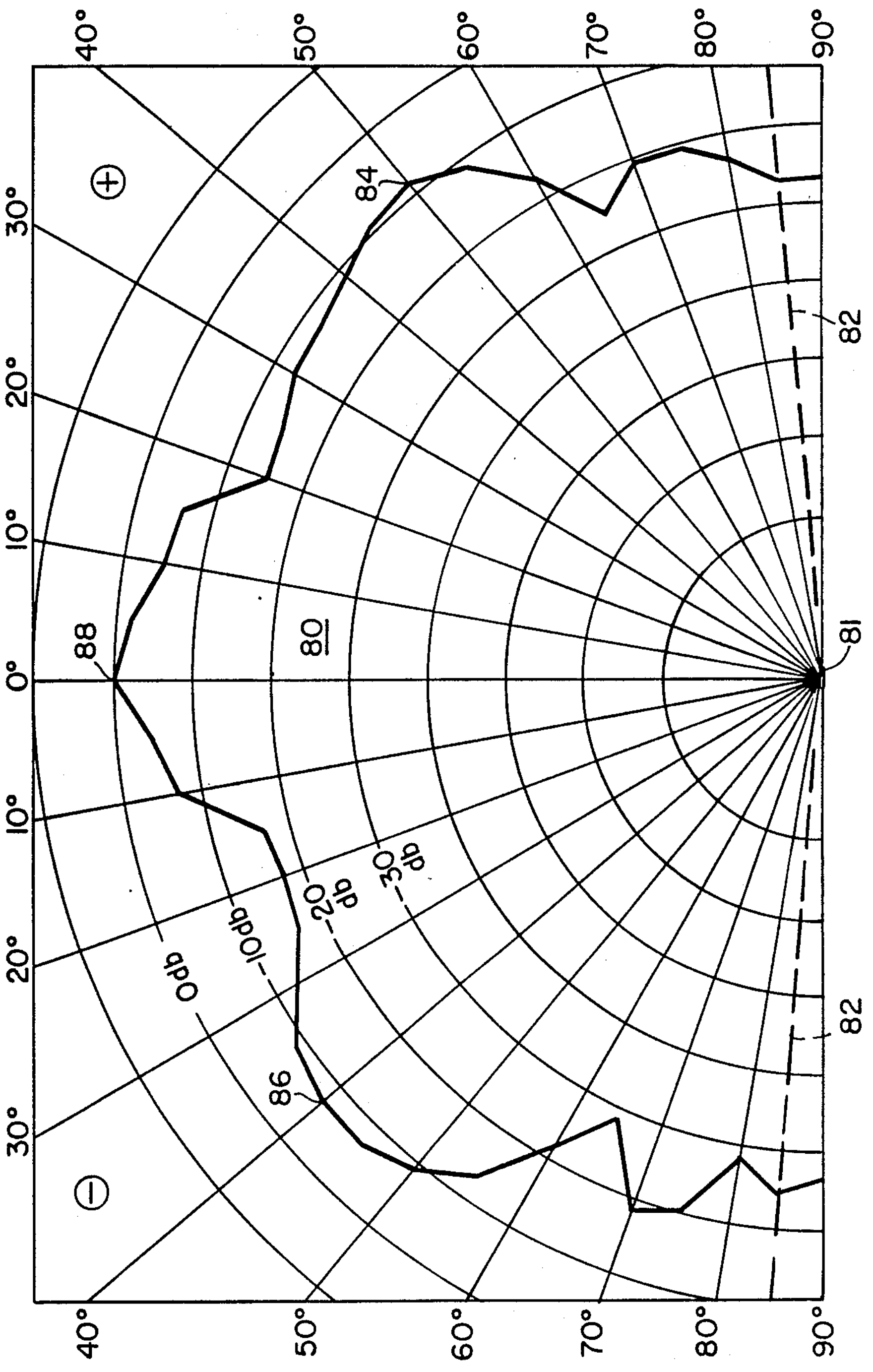

Intensity versus azimuthal angle for beamshapes of an unmodified transducer, a transducer having all but a central aperture masked, and a sensor apparatus according to this invention are shown in FIGS. 4–6, respectively. Beamshape 60, FIG. 4, exhibits a number of null zones 62 in which the signal is weak. The effective field of view of unmodified transducer 61, having a 1.4 inch diameter aperture, is represented by dashed lines 64 and is only 20 degrees from the main axis of beamshape 60. By comparison, beamshape 70 of masked transducer 71, FIG. 5, has a much wider field of view represented by dashed lines 72. However, large null zones 74 are present, and the entire signal is much lower. Transducer 71 has a 0.75 inch diameter aperture.

Baffled transducer 81 according to this invention, FIG. 6, has beamshape 80 which is much more uniformly distributed. Side lobes 84, 86 are nearly indistinguishable in energy from central lobe 88. Moreover, beamshape 80 has a dramatically enlarged field of view 82 which is 85 degrees or more from the central axis.

Figure 7:
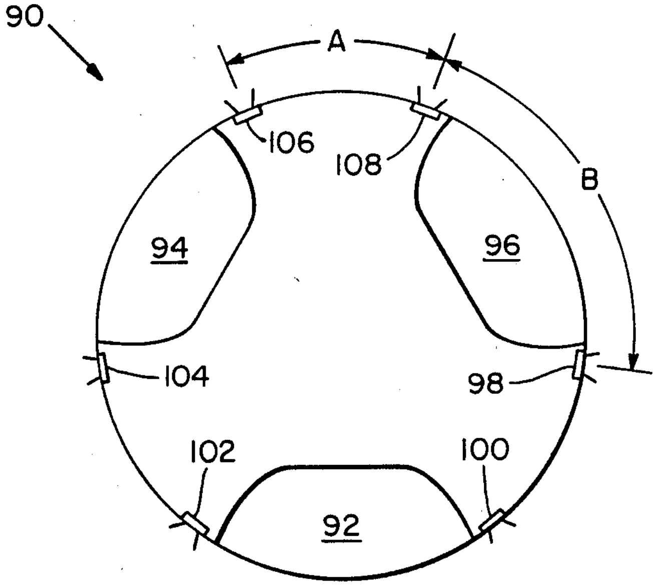
FIG. 7 is a schematic view of sensors according to this invention distributed about a mobile robot.

In one application, sensors with baffles according to this invention are carried by a mobile robot such as the robot described in U.S. Pat. No. 4,701,893 by Muller et al., incorporated herein by reference. The lower portion of robot 90, FIG. 7, is shown in schematic cross section through truck cavities 92, 94 and 96 with the trucks, such as trucks 20 and 22, FIG. 1 of U.S. Pat. No. 4,701,893, removed. Six sensors 98, 100, 102, 104, 106 and 108 according to this invention are distributed about robot 90 by angle A in the regions between cavities and by angle B in the regions on either side of a cavity. In one construction, angle A is 50 degrees and angle B is 70 degrees. Mounting these sensors near the base of robot 90 enhances obstacle avoidance of objects such as waste baskets and chairs. Sensors 98, 100 . . . 108 are ultrasonic transducers that are cycled successively and are used in conjunction with another array of sensors operated as a ranging system. Each sensor has a large field of view when operated to provide expansive coverage of the environment about the robot. Sensors 98, 100 . . . 108 are operated by a transducer control module such as shown in FIGS. 5A and 7A of U.S. Pat. No. 4,701,893. The baffles of sensors 98, 100 . . . 108 are constructed of spring steel.

Figure 8:
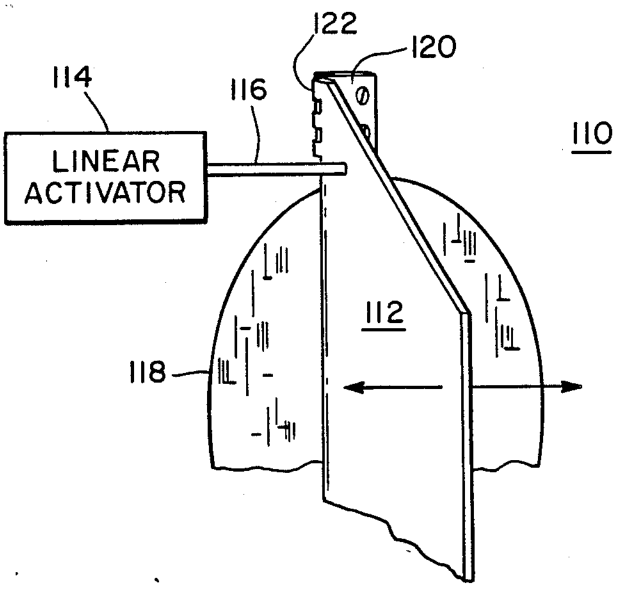
FIG. 8 is a schematic axonometric view of a baffle according to this invention having a movable blade.

Alternative sensor apparatus 110 according to this invention is shown in FIG. 8. Blade 112 is movable by linear actuator 114 through shaft 116 to vary the inclination of blade 112 relative to transducer 118. Base 120 is connected to blade apertures established for transducer 118. Changing the inclination of the blade or the size of the apertures changes the beam shape and can be used to determine the direction of a detected object relative to sensor apparatus 110.

While the base of a baffle according to this invention is shown attached to the surface of structure carrying the transducer, this is not a limitation of the invention. In one construction, the base lies in a recess within the sensor panel. Alternatively, the base is connected to a side edge of the blade rather than to the proximal edge. The term base is intended in its broad sense to refer to any mount or anchor for one or more blade elements. Further, when the baffle includes two or more blade elements, the blade elements can be separately mounted or can be joined by a bridge to establish the baffle as an integral unit.

Although specific features of the invention are shown in some drawings and not others, this is for convenience only as each feature may be combined with any or all of the other features in accordance with the invention.

Other embodiments will occur to those skilled in the art and are with the following claims:

What is claimed is:

1. A baffle for a sensor apparatus having a transducer for transmitting and receiving radiation within a field of view of said transducer, the baffle comprising a base securable proximate the transducer, and at least one blade element extending from said base, said blade element including a proximal edge for transecting the transducer to establish at least two apertures for the transducer, said blade element being reflective of radiation to reflect radiation to and from a region outside of said field of view and in which said baffle includes first and second base portions and first and second blade elements, extending from said first and second base portions, respectively, for establishing a central, proximal aperture proximate said transducer and a central, distal aperture between said blade elements, and for further establishing first and second side apertures on either side of said central, proximal aperture.

2. A wide-angle sensor apparatus comprising:

a transducer for receiving radiation, said transducer having a predetermined field of view; and a baffle having first and second base portions securable proximate said transducer and having first and second blade elements extending from said first and second base portions respectively and outwardly from said transducer, each said blade element including a proximal edge transecting said transducer to establish a central, proximal aperture proximate said transducer, a central distal aperture between said blade elements, and further establishing first and second side apertures on either side of said central, proximal aperture, each said blade element reflecting radiation received from outside said field of view toward said transducer.

3. The sensor apparatus of claim 2 in which said blade elements are inclined to establish said central, distal aperture wider than said central, proximal aperture.

4. The sensor apparatus of claim 2 in which said first and second blade elements are unequal in length.

5. The sensor apparatus of claim 4 in which said radiation has a predetermined wavelength and one of said first and second blade elements is shorter than the other by less than one predetermined wavelength.

6. The sensor apparatus of claim 2 in which said baffle further includes means for bridging said first and second base portions to establish said baffle as an integral unit.

7. A wide-angle sensor apparatus comprising:

a transducer having a predetermined field of view, for transmitting a pulse of radiation and for receiving an echo pulse, derived from said pulse, from within said field of view of said transducer; and a baffle having first and second base portions, said portions securable proximate said transducer and having first and second blade element extending from said first and second base portions respectively and outwardly from said transducer, each said blade element including a proximal edge transecting said transducer to establish a central, proximal aperture proximate said transducer, a central distal aperture between said blade elements, and further establishing first and second side apertures on either side of said central, proximal aperture, each said blade element being reflective of said radiation and said echo pulse, to transmit said pulse of radiation to a region outside of said predetermined field of view and to receive an echo pulse from a region outside said predetermined field of view.

8. The sensor apparatus of claim 7 in which said transducer transmits the radiation pulse at a predetermined wavelength, and said first and second blade elements have a length which is a function of said predetermined wavelength.

9. The sensor apparatus of claim 8 in which said first and second blade elements are unequal in length.

10. A baffle for a sensor apparatus having a transducer for transmitting and receiving radiation within a field of view of said transducer, the baffle comprising:

first and second base portions securable proximate the transducer, and first and second blade elements extending from said first and second base portions, respectively, each said blade element including at least a proximal edge for transecting the transducer to establish a central, proximal aperture proximate said transducer and a central, distal aperture between said blade elements, and for further establishing first and second side apertures on either side of said central, proximal aperture, each said blade element being reflective of said radiation to reflect said radiation to and from a region outside of said field of view.

* * * * *